(12) United States Patent
Dudar et al.

(10) Patent No.: US 10,480,163 B2
(45) Date of Patent: Nov. 19, 2019

(54) VEHICLE-TO-TRAILER TRANSFER OF HARVESTED AND PURIFIED WATER

(71) Applicant: FORD GLOBAL TECHNOLOGIES, LLC, Dearborn, MI (US)

(72) Inventors: Aed M Dudar, Canton, MI (US); Kenneth James Miller, Canton, MI (US); Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 339 days.

(21) Appl. No.: 15/417,793

(22) Filed: Jan. 27, 2017

(65) Prior Publication Data

US 2018/0216319 A1 Aug. 2, 2018

(51) Int. Cl.

| | |
|---|---|
| *E03B 3/28* | (2006.01) |
| *B60D 99/00* | (2009.01) |
| *B60H 1/32* | (2006.01) |
| *B60N 3/16* | (2006.01) |
| *B60N 3/18* | (2006.01) |
| *B67D 7/02* | (2010.01) |
| *B67D 7/76* | (2010.01) |
| *B67D 7/78* | (2010.01) |
| *B67D 7/84* | (2010.01) |
| *B60H 1/00* | (2006.01) |

(52) U.S. Cl.
CPC ............... *E03B 3/28* (2013.01); *B60D 7/00* (2013.01); *B60H 1/3233* (2013.01); *B60H 1/32331* (2019.05); *B60N 3/16* (2013.01); *B60N 3/18* (2013.01); *B67D 7/02* (2013.01); *B67D 7/76* (2013.01); *B67D 7/78* (2013.01); *B67D 7/845* (2013.01); *B60H 1/00364* (2013.01); *Y02A 20/109* (2018.01)

(58) Field of Classification Search
CPC .... B60H 1/3233; B60H 1/00364; B67D 7/02; B67D 7/76; B67D 7/78; B67D 7/845; B60D 7/00; B60N 3/16; B60N 3/18; Y02A 20/109; E03B 3/28
USPC ........................................................ 62/291
See application file for complete search history.

(56) References Cited

U.S. PATENT DOCUMENTS

| | | |
|---|---|---|
| 3,978,174 A | 8/1976 | Peer |
| 5,285,654 A | 2/1994 | Ferdows |

(Continued)

*Primary Examiner* — Joseph F Trpisovsky
(74) *Attorney, Agent, or Firm* — David Kelley; Brooks Kushman, P.C.

(57) ABSTRACT

A system for transferring harvested drinking water from a vehicle to a trailer towed behind the vehicle includes a vehicle reservoir for collecting water from a vehicle heat-exchanger. The reservoir includes a heating element for heating water within the vehicle reservoir. A vehicle controller is coupled with the vehicle reservoir and is programmed to boil the water in the vehicle reservoir. The controller is further programmed to measure a fill level of the vehicle reservoir. A trailer reservoir receives water from the vehicle reservoir. A trailer controller is coupled with the trailer reservoir and is programmed to measure a fill level of the trailer reservoir. The trailer controller is further programmed to transmit a wireless communication to the vehicle controller. The wireless communication is indicative of the fill level of the trailer reservoir. A fluid conduit fluidly connects the vehicle reservoir to the trailer reservoir.

19 Claims, 5 Drawing Sheets

(56) References Cited

U.S. PATENT DOCUMENTS

| | | | | |
|---|---|---|---|---|
| 5,435,151 A | * | 7/1995 | Han | B01D 1/0017 |
| | | | | 62/272 |
| 5,651,259 A | * | 7/1997 | Twyman | B60H 1/3233 |
| | | | | 62/188 |
| 2010/0025311 A1 | * | 2/2010 | Jones | B60S 1/50 |
| | | | | 210/149 |
| 2012/0221198 A1 | * | 8/2012 | Kohavi | B60H 1/00414 |
| | | | | 701/36 |
| 2013/0291580 A1 | * | 11/2013 | Lindner | B60H 1/3233 |
| | | | | 62/288 |
| 2016/0083936 A1 | | 3/2016 | Martin et al. | |

* cited by examiner

VEHICLE-TO-TRAILER TRANSFER OF HARVESTED AND PURIFIED WATER

TECHNICAL FIELD

This disclosure relates to water transfer from a vehicle, and more specifically, to vehicle-to-trailer transfer of harvested and purified water.

BACKGROUND

Many travelers tow recreational trailers behind their vehicles. Such travelers may travel long distances while towing the trailers from location to location. Trailers may be equipped with a water storage tank for a kitchen and/or a bathroom inside the trailer.

In many locations, clean drinking water may not be readily available. For example, water may be scarce in arid locations. Even in locations where water is more abundant, clean drinking water often is not available. For example, rural locations may lack drinkable water hookups. Travelers towing trailers in locations where clean drinking water is not readily available often are unable to utilize the kitchen or bathroom inside the trailer.

SUMMARY

A system for transferring harvested drinking water from a vehicle to a trailer towed behind the vehicle includes a vehicle reservoir for collecting water from a vehicle heat-exchanger. The reservoir includes a heating element for heating water within the vehicle reservoir. A vehicle controller is coupled with the vehicle reservoir and is programmed to boil the water in the vehicle reservoir. The controller is further programmed to measure a fill level of the vehicle reservoir. A trailer reservoir receives water from the vehicle reservoir. A trailer controller is coupled with the trailer reservoir and is programmed to measure a fill level of the trailer reservoir. The trailer controller is further programmed to transmit a wireless communication to the vehicle controller. The wireless communication is indicative of the fill level of the trailer reservoir. A fluid conduit fluidly connects the vehicle reservoir to the trailer reservoir.

A method for transferring harvested drinking water from a vehicle to a trailer includes harvesting water from a heat-exchanger in the vehicle and purifying the harvested water in a vehicle reservoir. The method further includes transferring the purified water from the vehicle reservoir to the trailer reservoir when a fill level in a trailer reservoir is below a predetermined threshold.

A water receiving system for a trailer for receiving harvested drinking water from a vehicle includes a trailer controller coupled with a trailer reservoir. The trailer controller is programmed to measure a fill level of the trailer reservoir. The trailer controller is further programmed to transmit a first wireless communication to a vehicle controller when the fill level is below a first predetermined threshold. The trailer controller is further configured to transmit a second wireless communication when the fill level achieves a second predetermined threshold.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
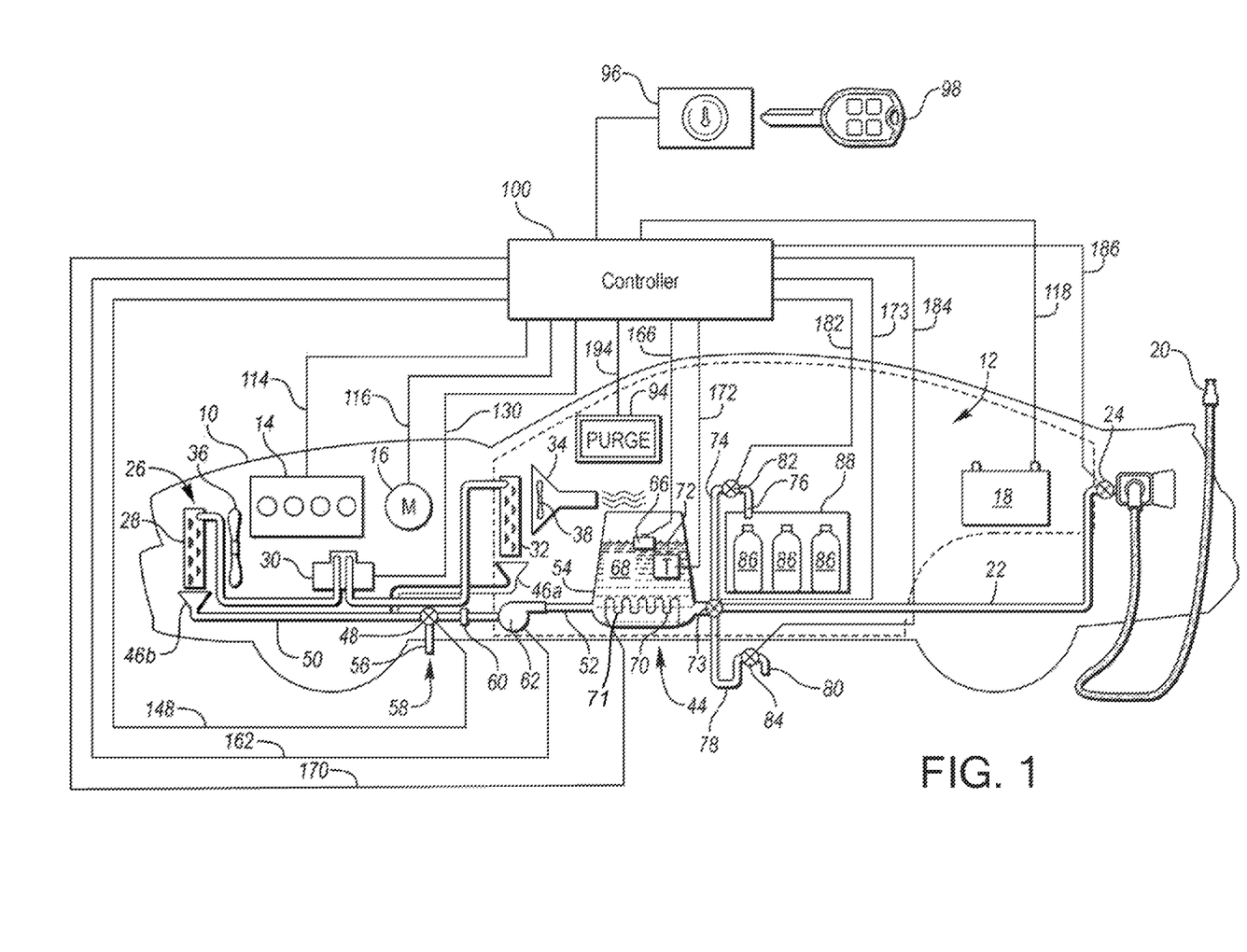
FIG. 1 is a diagrammatic illustration of a vehicular water harvesting and purification system.

FIG. 1 shows a vehicle 10 having a passenger compartment 12. Vehicle 10 may be a vehicle with an engine 14, an electric machine 16, or both cooperating as a prime mover of the vehicle. The engine 14 and electric machine 16 represent any machine designed to convert energy into useful mechanical motion. The engine 14 may be a gasoline engine, a diesel engine, or any form of an internal combustion engine that burns fuel. The electric machine 16 may be an electric motor. As such, the vehicle may be a traditional engine only vehicle, a battery-only electric vehicle (BEV), or may be a hybrid electric vehicle (HEV).

The vehicle 10 may have a battery 18. The battery 18 may be a high voltage traction battery that coupled with the electric machine 16 may provide the energy for the electric machine to provide motion.

The vehicle 10 may include an interface for receiving a trailer hose 20. The trailer hose 20 is capable of being attached at one end to the vehicle 10 and at another end to a trailer (not shown) disposed in proximity to the vehicle. Although described herein as a trailer hose, hose 20 may be any suitable connector capable of being connected at one end to the vehicle 10 and at another end to an external fluid destination.

Vehicle 10 has an air-conditioning system 26. The air-conditioning system 26 has a heat-exchanger 28 disposed outside of the passenger compartment 12, a compressor 30, and a heat-exchanger 32 disposed within the passenger compartment 12. The heat exchanger 28 located outside of the passenger compartment 12 may be referred to as a condenser 28. The heat exchanger 32 located within the passenger compartment 12 may be referred to as an evaporator 32. The compressor 30 may be driven by the engine 14, such as by an auxiliary drive belt off a crankshaft (not shown), or an auxiliary drive belt off the electric machine 16, or by having a separate compressor motor (not shown). The compressor motor may be provided energy from the high voltage traction battery 18 or from a 12 volt battery (not shown).

Other components of an air-conditioning system 26 may be present in the system, such as a pressure regulator, an expansion valve, an accumulator, a receiver, a desiccant filter, or the like. The air-conditioning system 26 may also include an electronic control system (not shown) and a series of ducts 34 to route conditioned air from the evaporator 32 into the passenger compartment 12. A fan 36 may be employed adjacent the heat-exchanger 28 to aid in improved airflow across heat-exchanger 28. A second fan 38, or a group of fans 38, may be disposed within the series of ducts 34 to aid in airflow across the heat-exchanger 32.

As a vehicle air-conditioning system 26 runs, water may condense on the heat exchangers 28, 32. Condensation is generally known as a change in the state of water vapor to liquid water when in contact with any surface. Generally, when the air-conditioning system 26 is used to cool the passenger compartment, condensation may occur on the surface of the heat-exchanger 32 disposed inside of the passenger compartment 12 as air is passed over heat-exchanger 32, although condensation may occur on the heat-exchanger 28 located outside the passenger compartment as well. The heat-exchanger 28 located outside of the passenger compartment 12 is in fluid contact with the ambient environment (or an equivalent environment within an engine compartment adjacent the ambient environment). The water that condenses on heat-exchanger 28 is from water vapor formerly held within air surrounding the heat-exchanger 28.

Vehicle 10 has a water harvesting and purification system 44. A collector 46a may be located near the heat-exchanger 32 to collect condensed water from the heat-exchanger 32. The collector 46a may also be located below the heat-exchanger 32 and gravity may be used to collect the water. A collector 46b may also be located near the heat-exchanger 28 and is configured to collect condensed water from the heat-exchanger 28. The collector 46b may be located below the heat-exchanger 28 and gravity may be used to collect the water.

The collectors 46a, 46b may be fluidly connected to a collection valve 48 via a collector line 50. Collection valve 48 may be a three-way valve, or a series of T-shaped valves. Collection valve 48 may also be an electric actuated valve 48. Collection valve 48 may be used to divert water from the collectors to a first fluid flow path 52 allowing water to flow from the heat-exchangers 28, 32 to a reservoir 54. Said another way, the collection valve 48 may be fluidly disposed between the heat-exchangers 28, 32 and the reservoir 54. Collection valve 48 may also be used to divert water from the collectors 46a, 46b to a second fluid flow path 56 allowing water to flow from the heat-exchangers 28, 32 to a drain 58 and outside of the vehicle 10.

The first fluid flow path 52 may include a filter 60. The filter 60 may be a mesh screen which is used for the separation of solids from fluids by interposing a medium through which the fluid can pass but not solids larger than the mesh sizing. The filter 60 may also be a chemical or ultraviolet filtration device which may be used to filter out undesirable bacteria, organic carbons, or the like. The filter 60 may be a number of filters 60. The first fluid flow path 52 may also include a pump 62. The filter 60 may be located before or after the pump 62. The filter 60 may also be located before the collection valve 48. Likewise, the pump 62 may also be located before the collection valve 48. The system may also operate without a filter 60 or pump 62, or provide more than one filter 60 or pump 62 at any location within the harvesting and purification system 44 to provide desired filtration, to move water, or to provide pressure where desired. Thus, the filter 60, if used, may be fluidly disposed between the heat-exchangers 28, 32 and the reservoir 54.

The reservoir 54 is fluidly connected with the heat-exchangers 28, 32 such that the reservoir 54 is configured to collect water from the heat-exchangers 28, 32. The reservoir 54 may be located inside or outside of the passenger compartment 12. The reservoir 54 may have a water level sensor 66. The water level sensor 66 may be a float 66 disposed within the reservoir 54 which floats on accumulated water 68 within the reservoir 54. The reservoir 54 may have a heating element 70 configured to heat the accumulated water 68. The heating element 70 may include an electric coil 71. The heating element 70 may be disposed within the water 68, or may be disposed in a wall of the reservoir 54. The accumulated water 68 may also be preheated by having the collector line 50 or first fluid flow path 52 warmed by other heat generating sources. For example, the collector line 50 may pass through or near the engine 14.

The reservoir 54 has a temperature sensor 72 configured to provide a temperature of the accumulated water 68. The temperature sensor 72 may be submerged in the water 68, may be in a wall of the reservoir 54, or may be part of the heating element 70. The heating element 70 may be used to heat the accumulated water 68. The heating element 70 may be used to boil the accumulated water 68. The boiling of the water 68 may be done to remove additional impurities. The air-conditioning system 26 may be used to add heat to the water 68. After heating of the water 68, ducts 34 from the air-conditioning system 26 may be used to cool the water 68. A duct 34 of the multiple ducts 34 may be located proximate the reservoir 54 configured to facilitate cooling of the water 68. Additional cooling devices (not shown) may be used to cool the water 68 after being boiled.

The reservoir 54 may have an outlet valve 73. The outlet valve 73 may be a three-way valve similar to the collection valve 48, or may be a four-way valve. The outlet valve 73 may be actuated to allow the water 68 to flow out of the reservoir 54. A first dispensing line 74 may extend from the outlet valve 73 to a first spout 76 in the passenger compartment 12. A second dispensing line 78 may extend from the outlet valve 73 to a second spout 80 outside of the passenger compartment 12. A third dispensing line 22 may extend from the outlet valve 73 to the trailer hose 20. The reservoir 54 may be disposed within or outside of the passenger compartment 12. The first spout may be opened and closed by a first dispensing valve 82. The second spout 80 may be opened and closed by a second dispensing valve 84. The third dispensing line 22 to the trailer hose 20 may be opened and closed by a third dispensing valve 24. The first, second, and third valves 82, 84, 24 may be manual valves or electric actuated valves.

The first spout 76 may be configured to fill at least one water bottle 86. The water bottle 86 may be located within a water bottle compartment 88. The water bottle 86 may be a 12-ounce water bottle and the water bottle compartment 88 may be able to hold six water bottles 86. The water bottle compartment 88 may be sized to fit six water bottles 86, three wide and two deep. The first spout 76 may be moveable via a first spout motor (not shown) to fill each water bottle 86. Alternatively, the water bottles 86 may be on a rotatable tray or conveyor tray and each moveable to the first spout 76. The water bottle compartment 88 may be cooled by a duct 34 from the number of ducts 34 of the air-conditioning system 26. The water bottle compartment 88 may also be heated by a duct 34 from the number of ducts 34 of the air-conditioning system 26. The water bottle compartment 88 may be cooled by a separate refrigeration unit (not shown). The water bottle compartment 88 may be disposed in a dash panel or instrument panel adjacent, or in place of, a glove compartment. The system 44 provides a removable bottle 86 with purified water within reach of a driver of the vehicle 10.

The water harvesting and purification system 44 may also have a display 94 for relating information about the water harvesting and purification system 44 to a user. Information may include such data as amount or temperature of the accumulated water 68 in the reservoir 54, whether the accumulated water 68 has been purified, time elapsed since the accumulated water 68 has been purified, or the like. The display 94 may be located in a location visible to a user in the passenger compartment 12. The display 94 may be an existing display in an infotainment system (not shown). The display 94 may be located in a location visible to a user outside of the passenger compartment 12. An exterior display 94 may be within the passenger compartment 12 visible through a window, may be a projector that projects the data onto a window, or may be a series of lights in the exterior surface of the vehicle 10.

An ignition 96 may be connected to the vehicle 10. The ignition 96 may be controlled by a user to key-on and start the vehicle 10. When the vehicle 10 is key-on and started, either the engine 14, motor 16, or both may be used to propel the vehicle 10. As well, in the key-on state, the air-conditioning system 26 may be used to cool the vehicle and provide condensed water for the water harvesting and purification system 44. The user may also use the ignition 96 to key-off and stop the vehicle 10. The engine 14 and motor 16 may not propel the vehicle in a key-off state. A traditional key 98 is shown that may be inserted into the ignition 96 and used to key-on and key-off the vehicle 10, however the ignition may not need an inserted key 98, as it may be a button or have a proximity key, or the like.

The water harvesting and purification system 44 may operate the air-conditioning system 26 to generate condensed water even when the vehicle 10 is in a key-off state. The water harvesting and purification system 44 may operate the air-conditioning system 26 to generate condensed water even when the vehicle 10 is plugged into an external power source to recharge the battery 18. The water harvesting and purification system 44 may utilize the external power source to provide the energy necessary to operate the air-conditioning system 26 while the vehicle 10 is key-off.

A controller 100 may automate the water harvesting and purification system 44. The controller 100 may be coupled with the engine 14, if one is in the vehicle 10, as indicated by communication line 114. The controller 100 may be coupled with the motor 16, if one is in the vehicle 10, as indicated by communication line 116. The communication lines 114, 116 may communicate data to the controller 100 such as current use of the engine and/or motor 14, 16, among others.

The controller 100 may be coupled with the battery 18, as indicated by communication line 118. The communication line 118 may communicate data such as current state of charge, battery charge level, or whether the battery 18 is being recharged by an external power source (e.g., via a plug-in cable), among others. The controller 100 may be coupled with the compressor 30, as indicated by communication line 130. Communication line 130 may include data about the operation of the air-conditioning system 26, as well as provide a conduit for the controller 100 to control the operation of the compressor 30. The communication line 130 may also convey electrical current from the battery 18 to operate the compressor 30 when the engine 14 or motor 16 are not in use. The controller 100 may be coupled with the air-conditioning system 26, via the compressor 30, and programmed to, in response to the battery 18 being charged by an external electric source, operate the air-conditioning system 26 to generate water from the heat-exchangers 28, 32.

The controller 100 may be coupled with the collection valve 48, as indicated by communication line 148. The controller 100 may be programmed to actuate the control valve 48 to switch from the first fluid flow path 52 to the reservoir 54 or the second fluid flow path 56 to the drain 58. The controller 100 may be programmed to, in response to the water 68 in the reservoir 54 reaching a predetermined level, actuate the control valve 48 to inhibit water flow from the heat-exchangers 28, 32 to the reservoir 54. The controller 100 may be programmed to, in response to the water 68 in the reservoir 54 reaching a predetermined level, switch the collection valve 48 from the first fluid flow path 52 to the second fluid flow path 56. The controller 100 may be programmed to, in response to the water 68 in the reservoir 54 reaching a predetermined level, turn off the air-conditioning system 26 if being run during key-off/plug-in state.

The controller 100 may be coupled with the water level sensor 66, as indicated by communication line 166. The communication line 166 may convey data relating to the level of water 68 in the reservoir 54. The communication line 166 may convey the water 68 in the reservoir 54 reaching a predetermined level. The predetermined level may be different for each programmed operation. The predetermined level may be at least 12 ounces. The predetermined level may be greater than 72 ounces (enough to fill six 12 ounce bottles). The controller 100 may be coupled with the pump 62 via communication line 162. The controller 100 may be programmed to actuate pump 62 to move water or provide pressure within the water harvesting and purification system 44. The controller 100 may utilize the pump 62 to provide the pressure needed for the water 68 to reach the predetermined level.

The controller 100 may be coupled with the heating element 70 via communication line 170. The controller 100 may utilize the heating element 70 to heat the water 68. The controller 100 may utilize the heating element 70 to boil the water 68. The controller 100 may be programmed to, in response to the water 68 in the reservoir 54 reaching a predetermined level, boil the water 68. The controller 100 may be coupled with a temperature sensor 72 via communication line 172. The controller 100 may be programmed to, in response to the water 68 having a temperature indicative of boiling, maintain the temperature of the water for a predetermined period of time. The predetermined time period may be at least one minute. The controller 100 may be further programmed to, in response to the water reaching a predetermined temperature below a temperature indicative of boiling, indicate that the water 68 is ready to drink.

The controller 100 may be coupled with the outlet valve 73 via communication line 173. The controller 100 may actuate the outlet valve 73 to provide water to the first or second fluid flow paths 74, 78, or to maintain water 68 in the reservoir 54 until purified or until at a desired temperature. The controller 100 may be coupled with the first dispensing valve 82 via communication line 182. the controller 100 may be programmed to open the first dispensing valve 82 to automatically fill a water bottle 86. Alternatively, a user may initiate the opening and closing of the first dispensing valve 82 by a touch sensitive button, or the like (not shown).

The controller 100 may be coupled with the second dispensing valve 84 via communication line 184. The controller 100 may be programmed to open the second dispensing valve 84 to automatically purge water from the reservoir. Alternatively, a user may initiate the opening and closing of the second dispensing valve 84 by a touch sensitive button, or the like (not shown). The second dispensing valve 84 in conjunction with the second spout 80 provide an option of filling up any container outside of the vehicle 10.

The controller 100 may be coupled with the third dispensing valve 24 via communication line 186. The controller 100 may be programmed to open the third dispensing valve 24 to provide water to the trailer hose 20. Alternatively, a user may initiate the opening and closing of the third dispensing valve 24 by a touch sensitive button, or the like (not shown). The third dispensing valve 24 in conjunction with the trailer hose 20 provide an option of transferring fluid, for example, to a trailer nearby the vehicle 10.

The controller 100 may be further programmed to purge the water 68 in the reservoir after a second predetermined period of time elapsing from the water having a temperature indicative of boiling. The second predetermined period of time may be at least 12 hours. The controller may be coupled with the display 94 via communication line 194. The controller 100 may be programmed to display information on the display 94. The display 94 may display information relating to the purging of the water 68, such as a countdown until the next purge. The display 94 may also show information relating the amount or temperature of the accumulated water 68 in the reservoir 54, whether the accumulated water 68 has been purified, time elapsed since the accumulated water 68 has been purified, number of water bottles 86 filled, different operating parameters of the system, or the like.

Figure 2:
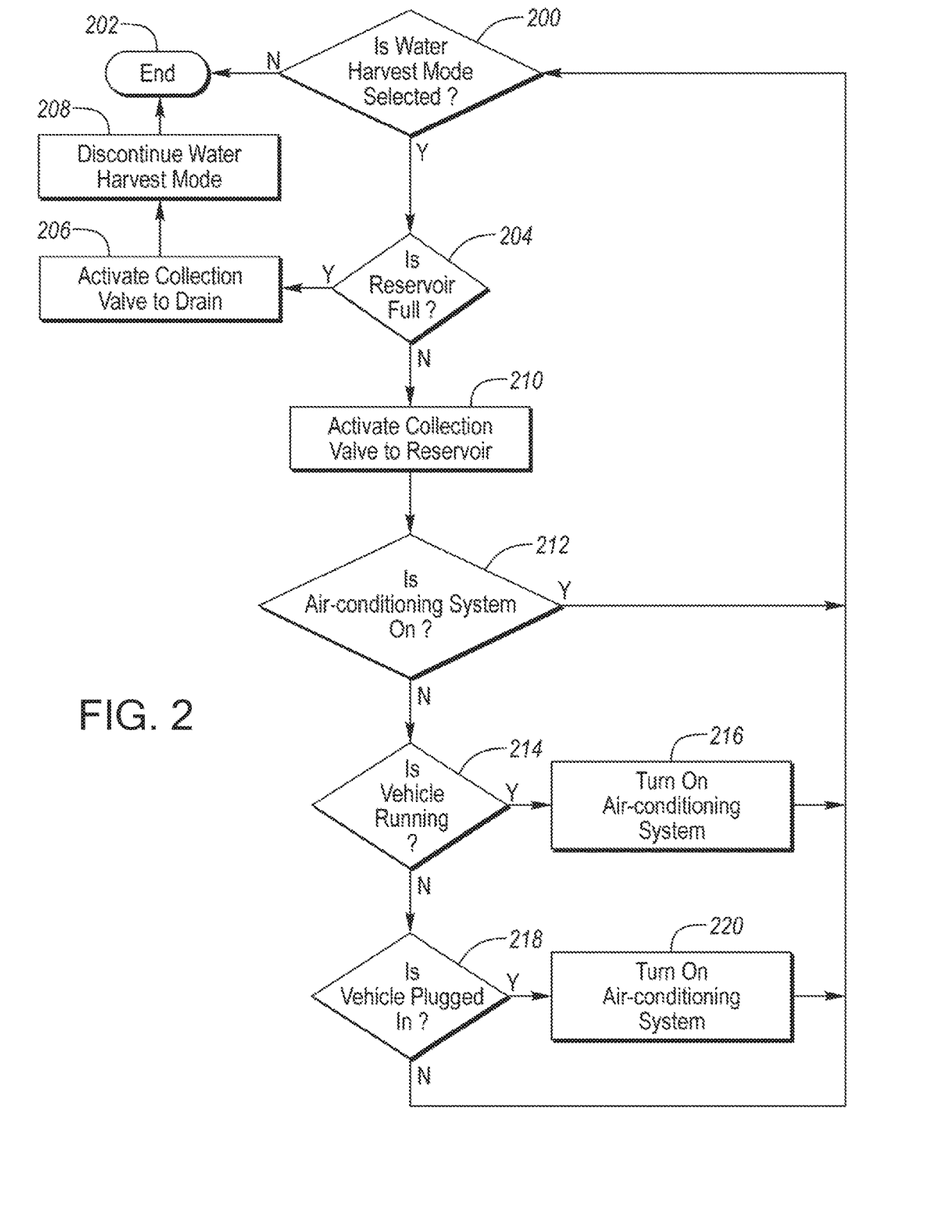
FIG. 2 is a flowchart illustrating an example of automatic water harvesting.

FIG. 2 shows an example of control logic, utilizing the above disclosed components, for the harvesting of water. Decision diamond 200 determines whether a water harvest mode has been selected by a user. If no water harvest mode has been selected, the logic flow moves to end block 202. Decision diamond 200 allows the automatic harvesting of water to be turned off. If the water harvest mode has been selected, the flow moves to decision diamond 204.

Decision diamond 204 determines whether water in a reservoir has reached a predetermined level. The predetermined level may be a full line. If the reservoir is full, the logic flow moves to action block 206, then to action block 208, and then to end block 202. Action block 206 actuates a collection valve to send any water condensed off a heat-exchanger to a drain. Action block 208 discontinues the water harvest mode. Action block 208 will turn off any and all other action blocks in this strategy flow diagram. If the reservoir is not full, the logic flow moves to action block 210.

Action block 210 actuates the collection valve to direct water from the heat-exchanger to the reservoir. The logic flow then moves to decision diamond 212 where it is determined whether an air-conditioning system is operating. If an air-conditioning system is operating, then the flow returns to decision diamond 200. This allows for a do-loop until the reservoir is filled or the water harvest mode is turned off by a user. If the air-conditioning system is not operating, the logic flow moves to decision diamond 214.

Decision diamond 214 determines whether the vehicle is running. If the vehicle is key-on and running, then the logic flow moves to action block 216. Action block 216 turns on the air-conditioning system and the flow returns to decision diamond 200. This allows for a do-loop in the logic flow until the reservoir is filled, the harvest mode turned off, or the vehicle turned off. If the vehicle is key-off, then the logic flow moves to decision diamond 218.

Decision diamond 218 determines whether the vehicle is plugged in to an external power source. If the vehicle is plugged in, then the logic flow moves to action block 220 and turns on the air-conditioning system to harvest water from the ambient air. The external power source provides the energy needed to run the air-conditioning system without draining a battery or gas tank. After action block 220, the logic flow returns to decision diamond 200. This allows for a do-loop in the logic flow until the reservoir is filled, the harvest mode turned off, the vehicle is unplugged, or the vehicle is keyed back on. If the vehicle is not plugged in, then the logic flow returns to decision diamond 200. This allows for a do-loop in the logic flow until the reservoir is filled, the harvest mode turned off, the vehicle is keyed back on, or the vehicle is plugged in.

Figure 3:
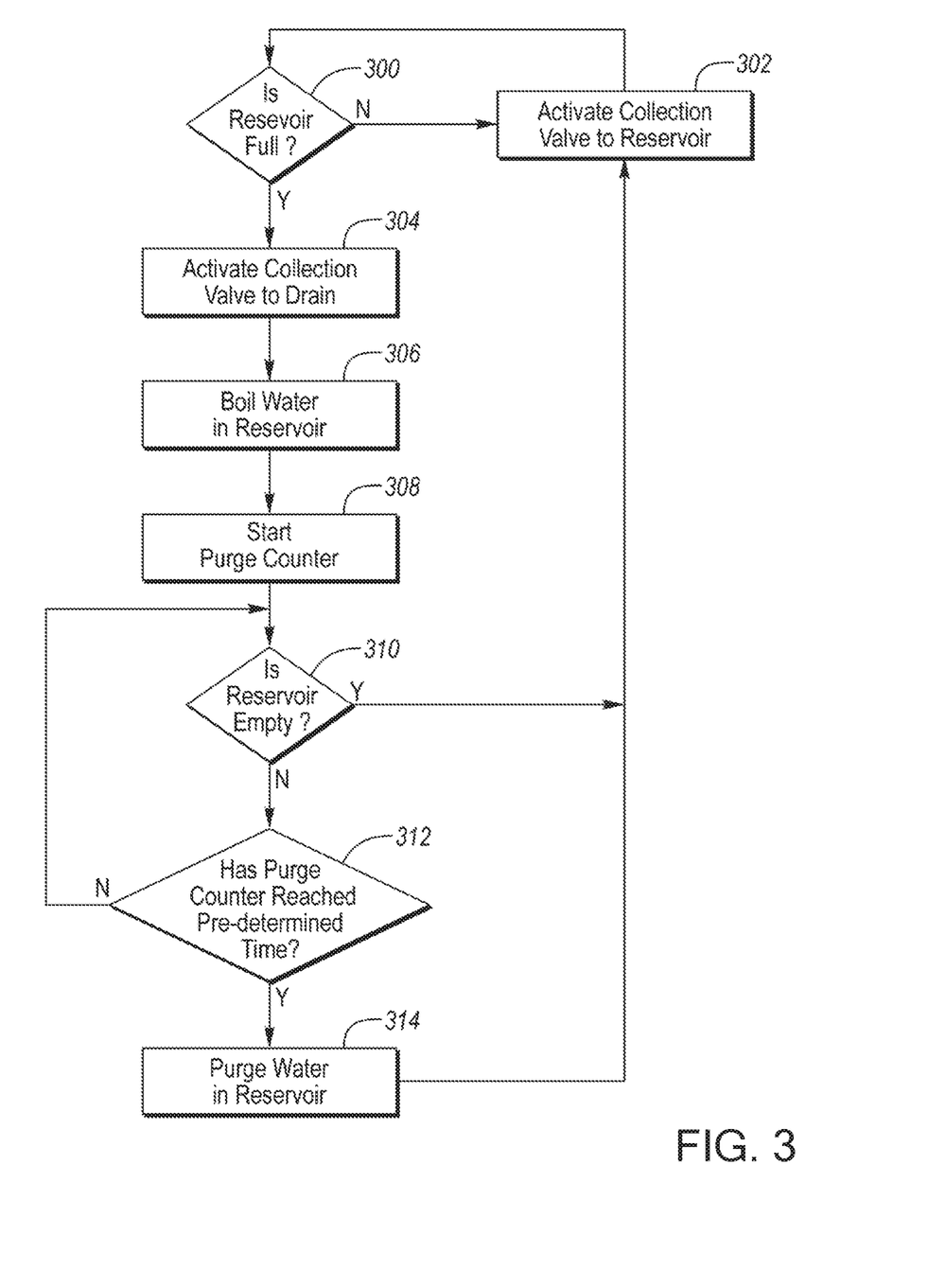
FIG. 3 is a flowchart illustrating an example of automatic water purification.

FIG. 3 shows an example of control logic, utilizing the above disclosed components, for the purification of water. Decision diamond 300 determines whether water in a reservoir has reached a predetermined level. The predetermined level may be a full line. If the reservoir is not yet full, the logic flow moves to action block 302. Action block 302 actuates a collection valve to send any water condensed off a heat-exchanger to the reservoir and then returns the logic flow to decision diamond 300. This provides a do-loop in the logic flow until the reservoir fills. If the reservoir is full, the logic flow moves to action blocks 304, 306, 308.

Action block 302 activates the collection valve to send water condensing off an evaporator to the drain and not to the reservoir. This allows for the water accumulated in the reservoir to be isolated. Action block 306 provides for the water in the reservoir to be brought to a boil. This allows for the water to be purified by the heat. Action block 306 may have a duration of at least one minute. Action block 308 starts a purge counter on the boiled water. after action blocks 304, 306, 308, the logic flow moves to decision diamond 310.

Decision diamond 310 determines whether the water in the reservoir has been emptied. If the water has been emptied, then the logic flow moves to action block 302 and back to decision diamond 300. This provides for a do-loop in the logic flow to allow the system to automatically fill itself and purify the accumulated water and refill itself and re-purify newly accumulated water so long as the older purified water has been discarded or used. If the reservoir still has some water remaining in it, then the logic flow moves to decision diamond 312.

Decision diamond 312 determines whether the purge counter has reached a predetermined time. In other words, it determines how much time has elapsed since the water was purified. The predetermined time may be at least 12 hours. If the predetermined time has not elapsed, then the logic flow returns to decision diamond 310. This allows for a do-loop in the logic flow until all of the water in the reservoir is discarded or used, or until the purge counter has reached its limit. If the purge counter has reached its limit, then the logic flow moves to action block 314. Action block 314 purges all of the water from the reservoir. This provides for the discarding of unused water and the prevention of the water in the reservoir from becoming un-purified. After action block 314, the logic flow returns to action block 302 and decision diamond 300. this allows for a do-loop in the logic flow to refill the reservoir and re-purify the water.

This logic flow chart may also include an action block of filtering the water (not shown) before or after action block 306 of boiling the water. The filtering of the water may include a mesh screen or other filtering techniques such as ultraviolet light or the like.

Figure 4:
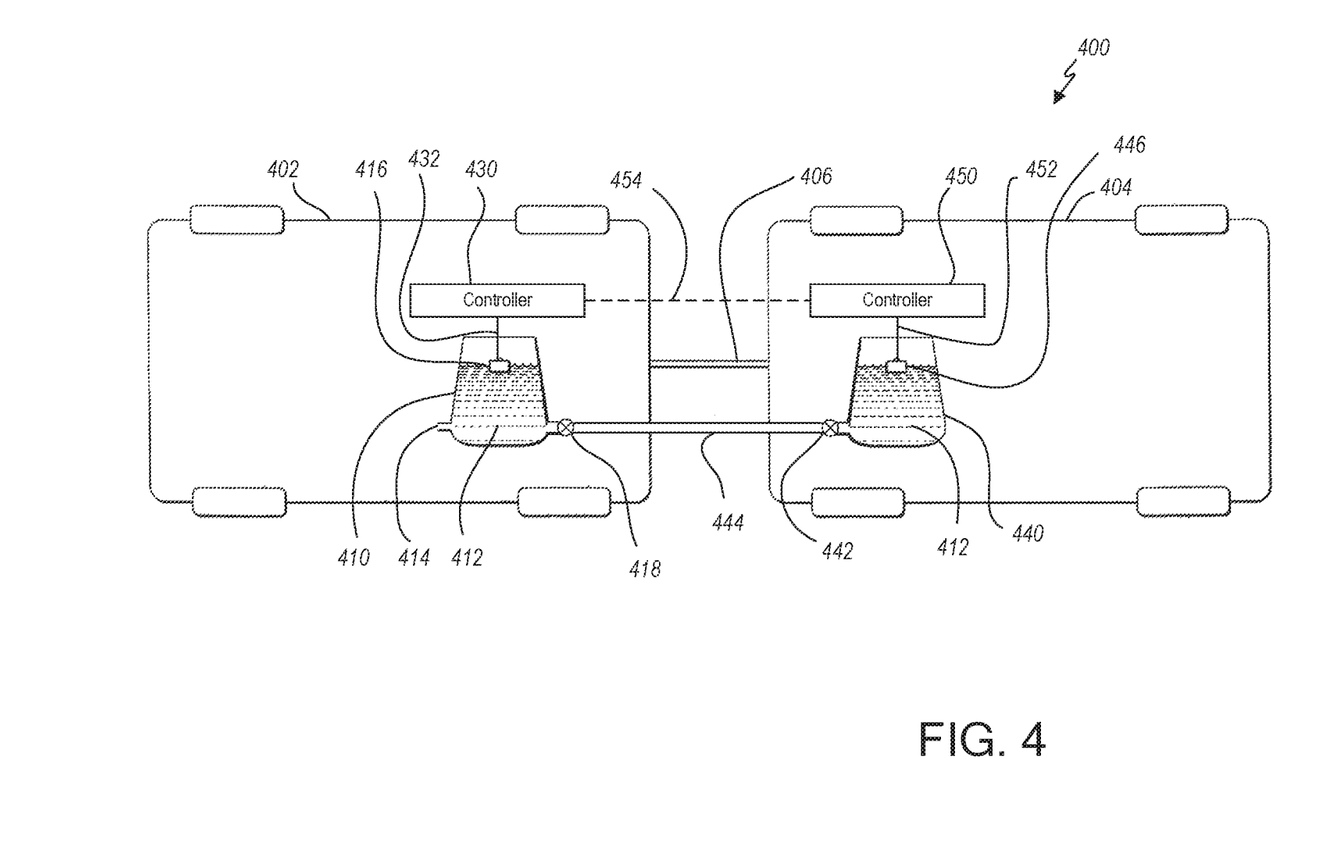
FIG. 4 is a diagrammatic illustration of a vehicle-to-trailer water transfer system.

Referring now to FIG. 4, a vehicle-to-trailer transfer system 400 may permit transfer of a fluid such as water from a vehicle 402 to a trailer 404. The trailer 404 may be secured to the vehicle 402 using a conventional trailer hitch or towing assembly 406 such that trailer 404 may be towed behind the vehicle 402.

The trailer 404 may be any transportable object suitable for being towed behind a vehicle, such as a mobile home, a travel trailer, a popup camper, a semi-trailer, a construction trailer, a full trailer, a medical trailer, a bicycle trailer, a motorcycle trailer, a horse or livestock trailer, or a boat trailer. The trailer 404 may be another vehicle such as a car, or may be a boat towed on a rolling trailer. As such, trailer 404 may refer to any transportable object capable of receiving water transferred from a vehicle 402 as discussed herein.

The vehicle 402 includes a reservoir 410 for storing water 412. The water 412 may be water harvested and purified pursuant to the water harvesting and purification system 44 described with respect to FIG. 1, and may be received at an inlet 414 of the reservoir 410. The reservoir 410 may include one or more of the components described with respect to reservoir 54 of FIG. 1. For example, the reservoir 410 preferably includes a water level sensor 416 such as a float disposed within the reservoir 410 which floats on accumulated water 412 within the reservoir 410. The reservoir 410 also includes an outlet valve 418.

The vehicle-to-trailer transfer system 400 further includes a controller 430 in the vehicle 402. The controller 430 may be coupled with the water level sensor 416, as indicated by communication line 432. The communication line 432 may convey data relating to the level of water 412 in the reservoir 410. The communication line 432 may convey the water 412 in the reservoir 410 reaching a predetermined fill level. The predetermined fill level may be different for each programmed operation. The predetermined fill level may be at least 12 ounces, and may be greater than 72 ounces. The controller 430 may be coupled with a pump (e.g., pump 62), and may be programmed to actuate the pump to move water or provide pressure within the water harvesting and purification system. The controller 430 may utilize the pump to provide the pressure needed for the water 412 to reach the predetermined fill level.

The trailer 404 also includes a reservoir 440 for storing water 412. The water 412 may be received at an inlet valve 442 of the reservoir 440. The inlet valve 442 is connected to the outlet valve 418 of the vehicle by a water conduit 444. The water conduit 444 is preferably a hose or other flexible connector capable of transferring water between the vehicle 402 and the trailer 404 while preferably also accounting for forces arising from relative movement of the trailer 404 with respect to the vehicle 402. The water conduit 444 may include quick-connect interfaces (e.g., snap-fit, twist-fit, or magnetic interfaces) for quickly connecting and disconnecting the water conduit 444. The reservoir 440 preferably includes a water level sensor 446 such as a float disposed within the reservoir 440 which floats on accumulated water 412 within the reservoir 440.

The vehicle-to-trailer transfer system 400 further includes a controller 450 in the trailer 404. The controller 450 may be coupled with the water level sensor 446, as indicated by communication line 452. The communication line 452 may convey data relating to the level of water 412 in the reservoir 410. The communication line 452 may convey the water 412 in the reservoir 410 reaching a predetermined fill level. The predetermined fill level may be different for each programmed operation. The predetermined fill level may be a minimum water level (e.g., at least 12 ounces) and/or may be a maximum water level (e.g., approximately 72 ounces or approximately 360 ounces).

In some approaches, the fill level of the vehicle reservoir 410 and/or the trailer reservoir 440 may be conveyed to a user at a user interface. The user interface may include a visual or audio indicator. For example, the user interface may be display 94 described with respect to FIG. 1. A user interface may similarly or instead be disposed at the trailer 404. The indicator provided by the user interface may indicative of the fill level of one or both of the vehicle reservoir 410 and the trailer reservoir 440, or may be a water transfer status, for example, as detected by one or both of the controllers 430, 450.

The controllers 430, 450 preferably include communication interfaces providing for a communication line 454 between the controllers 430, 450. In a preferred approach, communication between the controllers 430, 450 is a wireless communication. For example, the controllers 430, 450 may communicate via cellular network 130, WiFi®, Bluetooth®, local area network (LAN), cellular networks, ad-hoc wireless networks (e.g., Zigbee® or Z-Wave), etc. One or both controllers 430, 450 may include a CAN wireless bus interface. In another approach, the controllers 430, 450 communicate through a wired communication interface. A combination of wired and wireless protocols may also be used to provide communication between the controllers 430, 450.

Figure 5:
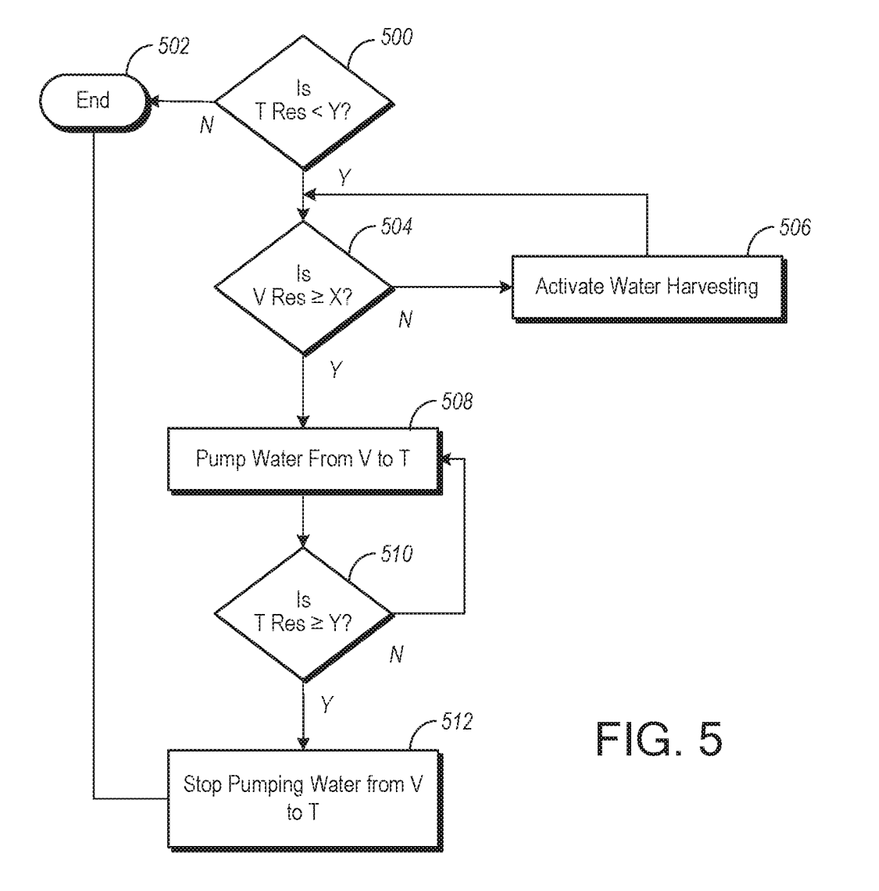
FIG. 5 is a flowchart illustrating an example of automatic water transfer.

FIG. 5 shows an example of control logic, utilizing the above disclosed components, for transfer of harvested and purified water from a vehicle to a trailer. Decision diamond 500 determines whether a water level in a trailer reservoir is below a predetermined level. In one approach, the predetermined level is a maximum fill level, such as 360 ounces. In another approach, the predetermined level is an intermediate fill level. The predetermined level may be a percentage of the maximum fill level of the trailer reservoir. For example, the predetermined level may be approximately 25% to 95%. The determination of the water level in the trailer reservoir may be performed by a water level sensor such as float 446 of FIG. 4.

If the water level in the trailer reservoir is not below the predetermined level, the water available from the trailer reservoir may be considered sufficient for user use. As such, the flow logic moves to end block 502.

If water in the trailer reservoir is below the predetermined level, the logic flow moves to decision diamond 504. Decision diamond 504 determines whether water in a vehicle reservoir has reached a predetermined level. In one approach, the predetermined level is a minimum fill level, such as 12 ounces. In another approach, the predetermined level is a maximum fill level. In still another approach, the predetermined level is a percentage of the maximum fill level. For example, the predetermined level may be approximately 25% to 95%. The determination of the water level in the vehicle reservoir may be performed by a water level sensor such as float 416 of FIG. 4. Other approaches for determining a water level are contemplated.

If water in the vehicle reservoir has not reached a predetermined level, the logic flow moves to action block 506. Action block 506 actuates a logic for the harvesting of water, for example, as described with reference to FIG. 2. The logic flow then returns to decision diamond 504. This provides a do-loop in the logic flow until the vehicle reservoir fills to the predetermined level.

Upon determining water in the vehicle reservoir has reached a predetermined level, the logic flow moves to action block 508. At action block 508, water is pumped from the vehicle reservoir, through fluid conduit (e.g., conduit 444 of FIG. 4), to the trailer reservoir. Pumping of the water may be performed by a pump in the vehicle (e.g., pump 62 of FIG. 1) or a pump in the trailer. Other suitable approaches for transferring fluid from the vehicle reservoir to the trailer reservoir are expressly contemplated herein.

As described herein, controllers associated with the vehicle reservoir and the trailer reservoir may be in communication with water level sensors associated with the vehicle reservoir and trailer reservoir. Furthermore, the trailer reservoir is preferably in communication with the vehicle reservoir (e.g., through a wireless communication protocol).

Communication between the trailer reservoir and the vehicle reservoir allows for real-time monitoring and diagnostics of the fluid delivery system. For example, the vehicle controller, having initiated the fluid delivery, is informed of successful fluid delivery as indicated by an increase in the water level of the trailer reservoir. Similarly, the vehicle controller is informed of unsuccessful delivery as indicated by a lack of increase (or even decrease) in the water level of the trailer reservoir, despite the activation of the fluid delivery system. In one approach, the controller may determine fluid delivery has been unsuccessful when the fluid level of the trailer reservoir has not increased after a predetermined time from activation of the fluid delivery system. For example, if after one minute has elapsed since the time from activation of the fluid delivery system, and the controller of the trailer reports no increase in the water level of the trailer reservoir, the controller of the vehicle may determine the fluid delivery was unsuccessful. Unsuccessful delivery may be indicative of a pump failure, a valve failure, a misconnection of the fluid conduit, a leak in the fluid conduit, a leak in one or both of the reservoirs, or a trailer reservoir water level sensor failure. The controller of the trailer may similarly assess delivery success based on information conveyed from the vehicle controller.

Upon initial transfer of water (or upon transferring a predetermined amount of water) from the vehicle reservoir to the trailer reservoir, the logic flow moves to decision diamond 510. Decision diamond 510 determines whether water in the trailer reservoir has reached a predetermined level. In a preferred approach, the predetermined level is the same predetermined level as described with respect to decision diamond 500. In another approach, the predetermined level is greater than the predetermined level as described with respect to decision diamond 500.

If water in the trailer reservoir has not reached the predetermined level, the logic flow returns to action block 508, where water continues to be pumped from the vehicle reservoir to the trailer reservoir. This provides a do-loop in the logic flow until the trailer reservoir fills to the predetermined level.

If water in the trailer reservoir has reached the predetermined level, the logic flow moves to action block 512, where the delivery of water from the vehicle reservoir to the trailer reservoir is stopped. The logic flow may then move to end block 502.

In one approach, action block 512 is actuated through a controller-to-controller communication. For example, a controller associated with the trailer reservoir, upon determining the trailer reservoir has reached the predetermined level, may transmit a wireless communication to the controller associate with the vehicle reservoir informing the vehicle controller that the trailer reservoir has reached the predetermined level. In response to receiving the communication, the vehicle controller may actuate action block 512 to stop the delivery of water from the vehicle reservoir to the trailer reservoir. In another approach, the trailer controller and vehicle trailer may communicate through a wired communication protocol.

In another approach, actuation block 512 is actuated by the trailer controller closing a trailer-side valve (e.g., inlet valve 442 of FIG. 4). In this approach, water flow from the vehicle reservoir will be inhibited. Through real-time monitoring of the water level in the vehicle reservoir, the vehicle controller will be informed that the fill level in the reservoir is not decreasing. As such, the vehicle controller may halt the delivery of water from the vehicle reservoir by closing a vehicle-side valve.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for transferring harvested drinking water from a vehicle to a trailer towed behind the vehicle, comprising:
   a vehicle reservoir configured to collect water from a vehicle heat-exchanger, the vehicle reservoir including a heating element configured to heat water within the vehicle reservoir;
   a vehicle controller coupled with the vehicle reservoir and programmed to boil the water in the vehicle reservoir, the vehicle controller further programmed to measure a fill level of the vehicle reservoir;
   a trailer reservoir configured to receive water from the vehicle reservoir;
   a trailer controller coupled with the trailer reservoir and programmed to measure a fill level of the trailer reservoir, the trailer controller further programmed to transmit a wireless communication to the vehicle controller, wherein the wireless communication is indicative of the fill level of the trailer reservoir; and
   a fluid conduit fluidly connecting the vehicle reservoir to the trailer reservoir.

2. The system of claim 1, wherein the trailer controller is programmed to transmit a first wireless communication to the vehicle controller when the fill level of the trailer reservoir is below a first predetermined threshold, and a second wireless communication when the fill level of the trailer reservoir achieves a second predetermined threshold.

3. The system of claim 2, wherein in response to receiving the first wireless communication when the fill level of the vehicle reservoir is above a predetermined vehicle reservoir threshold fill level, the vehicle controller is programmed to effect delivery of water from the vehicle reservoir to the trailer reservoir.

4. The system of claim 2, wherein in response to receiving the first wireless communication when the fill level of the vehicle reservoir is below a predetermined vehicle reservoir threshold fill level, the vehicle controller is programmed to actuate a collection valve to send water condensed off the vehicle heat-exchanger to the vehicle reservoir.

5. The system of claim 2, wherein the vehicle controller is programmed to receive the first wireless communication and open a vehicle-side valve when the fill level of the vehicle reservoir is above a predetermined vehicle reservoir threshold fill level.

6. The system of claim 2, wherein the vehicle controller is programmed to stop delivery of water from the vehicle reservoir to the trailer reservoir when the fill level of the vehicle reservoir falls below a predetermined vehicle reservoir threshold fill level.

7. The system of claim 2, wherein the vehicle controller is programmed to receive the second wireless communication, and in response, stop delivery of water from the vehicle reservoir to the trailer reservoir.

8. The system of claim 2, wherein the vehicle controller is programmed to receive the second wireless communication, and in response, close a vehicle-side valve.

9. The system of claim 1, further comprising:
a first float sensor disposed in the vehicle reservoir and in communication with the vehicle controller; and
a second float sensor disposed in the trailer reservoir and in communication with the trailer controller.

10. The system of claim 9, wherein the vehicle controller is programmed to determine a water delivery status based on physical positions of the first float sensor and the second float sensor.

11. The system of claim 1, further comprising:
a vehicle-side valve in communication with the vehicle controller; and
a trailer-side valve in communication with the trailer controller.

12. The system of claim 1, further comprising:
a user interface in the vehicle for displaying at least one of a water delivery status and the fill level of the trailer reservoir.

13. A method for transferring harvested drinking water from a vehicle reservoir to a trailer reservoir, the method comprising:
collecting water from a vehicle heat-exchanger in the vehicle reservoir;
with a vehicle controller, activating a heating element associated with the vehicle reservoir to boil the water in the vehicle reservoir;
with the vehicle controller, measuring a fill level of the vehicle reservoir;
with a trailer controller, measuring a fill level of the trailer reservoir;
with a trailer controller, transmitting a first wireless communication to the vehicle controller, wherein the wireless communication is indicative of the fill level of the trailer reservoir; and
in response to the trailer reservoir being below a threshold, transferring the water from the vehicle reservoir to the trailer reservoir.

14. The method of claim 13 further comprising:
with the trailer controller, transmitting a second wireless communication to the vehicle controller in response to the fill level of the trailer reservoir being below the first threshold; and
with the trailer controller, transmitting a third wireless communication to the vehicle controller in response to the fill level of the trailer reservoir achieving a second threshold.

15. The method of claim 13 further comprising:
with the vehicle controller, actuate a collection valve to send water condensed off the vehicle heat-exchanger to the vehicle reservoir.

16. The method of claim 14 further comprising:
with the vehicle controller, open a vehicle-side valve in response to the fill level of the vehicle reservoir being above a predetermined vehicle reservoir threshold fill level.

17. The method of claim 14 further comprising:
with the vehicle controller, stopping delivery of the water from the vehicle reservoir to the trailer reservoir in response to the fill level of the vehicle reservoir being below a vehicle reservoir threshold fill level.

18. The method of claim 14 further comprising:
with the vehicle controller, stopping delivery of water from the vehicle reservoir to the trailer reservoir in response to receiving the third wireless communication.

19. The method of claim 14 further comprising:
with the vehicle controller, closing a vehicle-side valve in response to receiving the third wireless communication.

* * * * *